US011608395B2

(12) United States Patent
Wang et al.

(10) Patent No.: US 11,608,395 B2
(45) Date of Patent: Mar. 21, 2023

(54) POLYACRYLATE MACROMOLECULAR PHOTOINITIATOR, SYNTHESIS METHOD THEREFOR AND USE THEREOF

(71) Applicant: INSIGHT HIGH TECHNOLOGY CO., LTD, Beijing (CN)

(72) Inventors: Chenlong Wang, Beijing (CN); Wenchao Zhao, Beijing (CN)

(73) Assignee: INSIGHT HIGH TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/042,967

(22) PCT Filed: Sep. 13, 2018

(86) PCT No.: PCT/CN2018/105392
§ 371 (c)(1),
(2) Date: Sep. 29, 2020

(87) PCT Pub. No.: WO2019/214121
PCT Pub. Date: Nov. 14, 2019

(65) Prior Publication Data
US 2021/0147585 A1    May 20, 2021

(30) Foreign Application Priority Data

May 11, 2018  (CN) .......................... 201810446088.8

(51) Int. Cl.
| C08F 2/50 | (2006.01) |
| C08F 4/28 | (2006.01) |
| C09D 4/06 | (2006.01) |
| C08F 220/18 | (2006.01) |
| C08F 220/30 | (2006.01) |

(52) U.S. Cl.
CPC ............... *C08F 4/28* (2013.01); *C08F 2/50* (2013.01); *C08F 220/1804* (2020.02); *C08F 220/302* (2020.02); *C09D 4/06* (2013.01)

(58) Field of Classification Search
CPC ...... C08F 2/38; C08F 2/48; C08F 2/50; C08F 220/1804; C08F 220/302; C08F 4/28; C09D 4/00; C09D 4/06
See application file for complete search history.

(56) References Cited

U.S. PATENT DOCUMENTS

| 4,861,916 | A |   | 8/1989 | Kohler et al. |
| 5,536,759 | A | * | 7/1996 | Ramharack .......... C09J 133/062 522/35 |
| 6,586,491 | B2 | * | 7/2003 | Husemann ........ C08F 220/1804 522/35 |
| 7,745,505 | B2 | * | 6/2010 | Liu ....................... C07C 271/12 522/34 |
| 2013/0296454 | A1 |   | 11/2013 | Madsen et al. |

FOREIGN PATENT DOCUMENTS

| CN | 1817914 A | 8/2006 |
| CN | 101012180 A | 8/2007 |
| CN | 102127173 A | 7/2011 |
| CN | 103703030 A | 4/2014 |
| CN | 105440167 A | 3/2016 |
| CN | 105585982 A | 5/2016 |
| CN | 107531612 A | 1/2018 |
| CN | 107629151 A | 1/2018 |
| DE | 3844444 A1 | 8/1990 |
| JP | H05204190 A | 8/1993 |
| JP | 2002169020 A | 6/2002 |
| WO | 2004048307 A1 | 6/2004 |

OTHER PUBLICATIONS

Carlini, C. Polymeric Photoinitiators Containing Side-chain Ketoaromatic Moieties for Fast Ultraviolet Initiated Polymerisation of Acrylic Monomers.Eur. Poly. J., 18: 236-241. (Year: 1986).*

\* cited by examiner

*Primary Examiner* — Sanza L. McClendon
(74) *Attorney, Agent, or Firm* — Gang Yu

(57) ABSTRACT

A polyacrylate macromolecular photoinitiator, a synthesis method therefor, and the use thereof. The polyacrylate macromolecular photoinitiator is free of a component having a molecular weight of less than 1000, and can effectively avoid the introduction of a material having a mall molecular weight in the photoinitiator and the odor and migration contamination produced thereby, the general formula thereof being as shown in formula I.

8 Claims, 1 Drawing Sheet

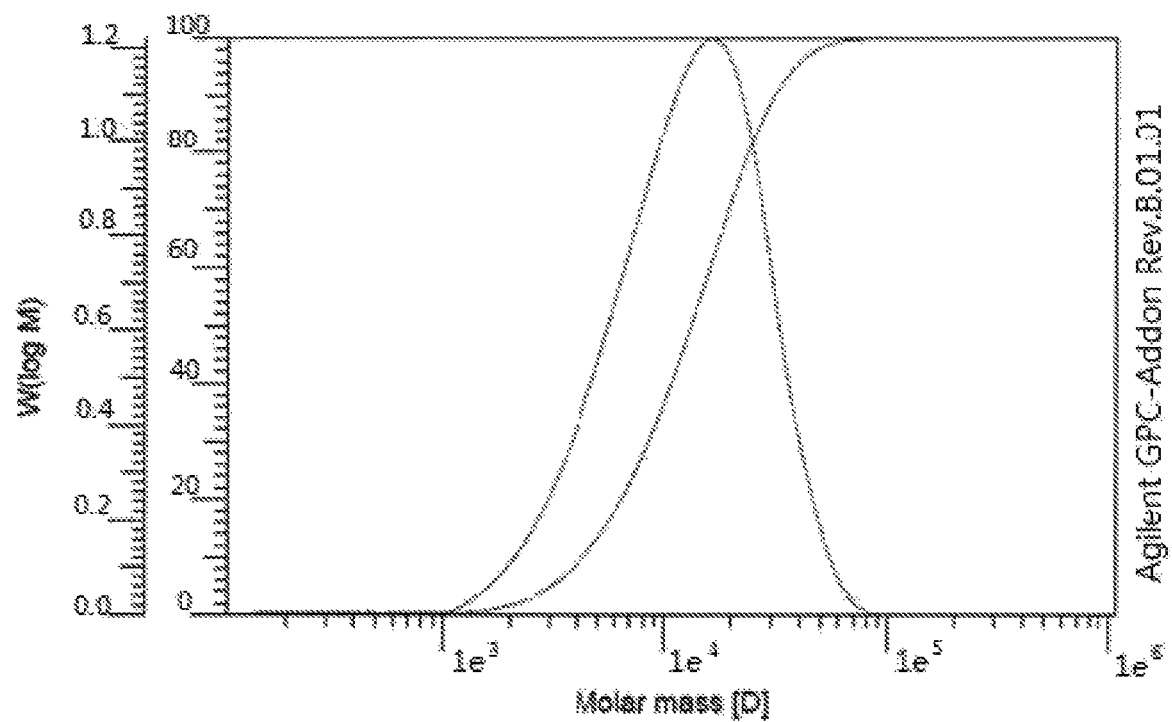

POLYACRYLATE MACROMOLECULAR PHOTOINITIATOR, SYNTHESIS METHOD THEREFOR AND USE THEREOF

TECHNICAL FIELD

The disclosure relates to a macromolecular photoinitiator, in particular to a polyacrylate macromolecular photoinitiator and a synthesis method therefor, and the use thereof.

BACKGROUND

The ultraviolet curing technology has characteristics of no volatile organic solvent, high curing speed, low energy consumption, good performance of cured products and the like, so that the ultraviolet curing technology is widely applied to the fields of coatings, inks, adhesives, photoresists, laser 3D printing and the like.

In conventional photocuring systems, residual small molecule photoinitiators or photolytic fragments thereof easily migrate from the cured coating to a surface, resulting in odor and even toxicity of the product during use. One way to avoid above problems is to introduce unsaturated double bonds into small molecule photoinitiators, i.e. polymerizable photoinitiators. The small molecule photoinitiator is anchored to the crosslinked network by participating in a polymerization. Another approach is to directly synthesize a macromolecular photoinitiator, anchor the photoinitiator to a macromolecular chain. Compared with small molecule photoinitiators, macromolecular photoinitiators have advantages of low volatility, low odor, low mobility, good compatibility with resins, functional diversity and so on, and is a photoinitiator with more obvious effect than the polymerizable photoinitiator. Macromolecular photoinitiators can generally be prepared by copolymerization of small molecule photoinitiators containing polymerizable double bonds with other monomers. Among them, benzophenone is inexpensive, and as a hydrogen abstraction type photoinitiator, it does not generate photolysis fragments as a cracking type, and thus has been studied more. For example, as shown in Formula IV, Carlini etc. obtained a high molecular photoinitiator containing benzophenone units by free radical copolymerization (Polymer, 1983, 24: 101):

Formula IV (a) 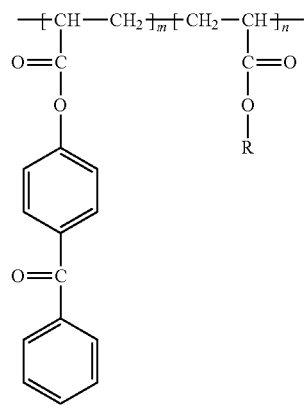

R = CH₃
CH₃CH₂OCH₂CH₂— etc.

(b) 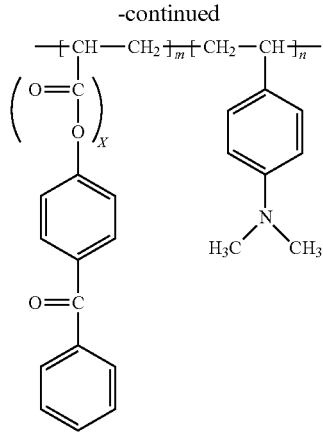

X = 0 or 1

Li Hao etc. (Photosensitive Science and Photochemistry, 2007, 25 (6)) synthesized a series of water-soluble macromolecular photoinitiators PTX-GA1, PTX-GA2, and PTX-GA3 by introducing thioxanthone and glucosamine into the same molecule through copolymerization and epoxy ring opening. This three photoinitiators can initiate acrylamide photopolymerization to obtain a better effect, a curing rate is PTX-GA3>PTX-GA2>PTX-GA1, and a structure is shown as formula V.

Formula V

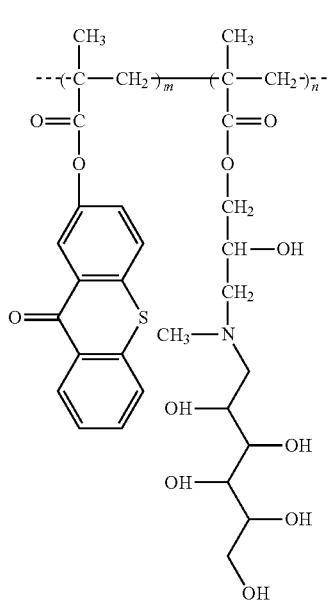

PTX-GA1 m:n = 3:1
PTX-GA2 m:n = 4:1
PTX-GA3 m:n = 8:1

Zeng Zhaohua etc. synthesized a macromolecular photoinitiator containing both benzophenone groups and hydrogen-donating amine groups as shown in formula VI. The macromolecular initiator fixes two benzophenone groups at two sides of a rigid triazine ring, reduces a probability of combining adjacent free radicals, and improves initiation efficiency. Meanwhile, the macromolecular initiator contains an amine group hydrogen supply unit, and no additional hydrogen supply component is needed.

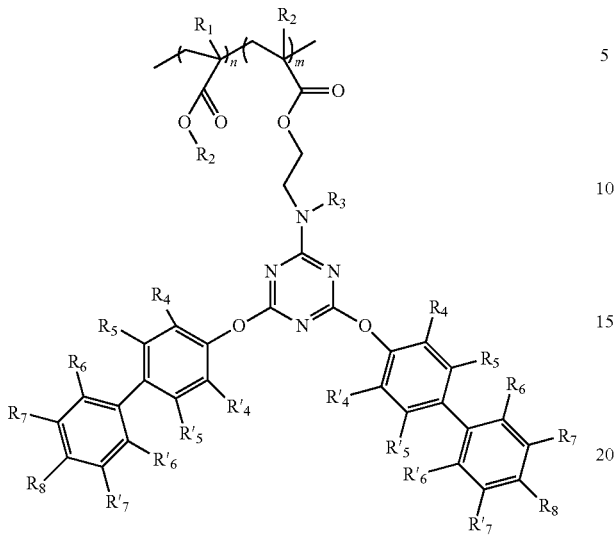

Formula VI

U.S. Pat. No. 9,951,034 discloses an use of 3-ketocoumarins as photoinitiators, which are particularly suitable for long-wave UV curing, but which are only small molecule photoinitiators and have not undergone macromolecularization.

In general, none of the presently disclosed macromolecular initiator requires the molecular weight of the product. It is then not guaranteed that the product is free of unreacted small molecule raw materials, or oligomers of lower molecular weight. These small molecule raw materials and oligomers remain readily migratable when used or become one of sources of migratory contamination. A relevant specification for EuPIA (European Printing Ink Association) is that substances with a molecular weight of more than 1000 Dt can be free of risk tests when additives are used in printing inks, i.e. substances having a molecular weight of less than 1000 Dt are to be subjected to risk tests and are considered useful when the test mobility is less than 10 ppb. The disclosure provides a polyacrylate macromolecular photoinitiator and a manufacturing method thereof, and the obtained product is free of a component having a molecular weight of less than 1000, so that introduction of a material having a mall molecular weight and migration contamination produced thereby can be effectively avoided.

SUMMARY

The disclosure provides a polyacrylate macromolecular photoinitiator, particularly, which is free of a component having a molecular weight of less than 1000, and a general formula thereof being as shown in formula I:

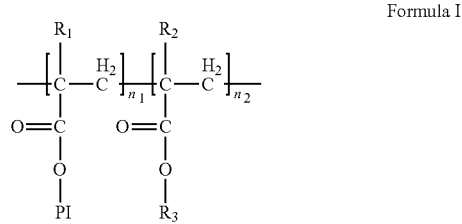

Formula I in formula I, PI is a hydrogen abstraction type photoinitiator group; $R_1$ and $R_2$ are each H or $CH_3$; $R_3$ is $C_1$-$C_8$ alkyl, $C_1$-$C_8$ alkyl substituted with hydroxy, $C_1$-$C_3$ alkyl terminally substituted with $C_5$-$C_6$ cycloalkyl, $C_5$-$C_6$ cycloalkyl or H; $n_1$ is an integer greater than or equal to 1; $n_2$ is an integer greater than or equal to 0.

The PI of the formula I in the disclosure is selected from benzophenone-type photoinitiator groups, coumarin-type photoinitiator groups or thioxanthone-type photoinitiator groups.

The PI of the formula I in the disclosure is selected from one or more of formulas II-1-II-11:

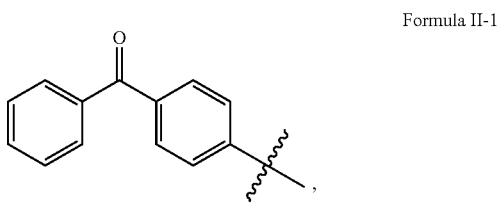

Formula II-1

Formula II-2

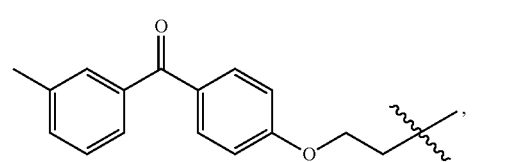

Formula II-3

Formula II-4

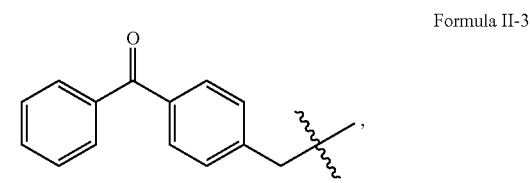

Formula II-5

Formula II-6

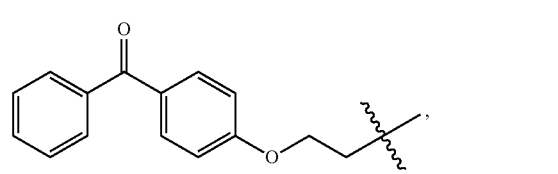

Formula II-7

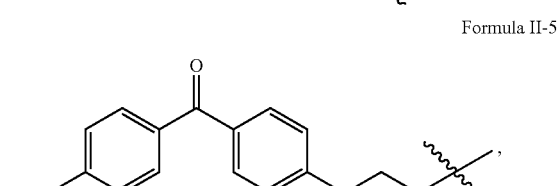

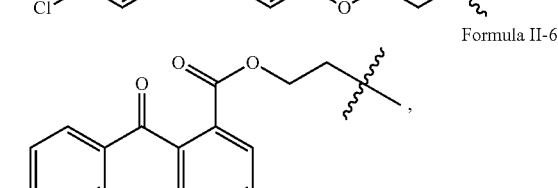

-continued

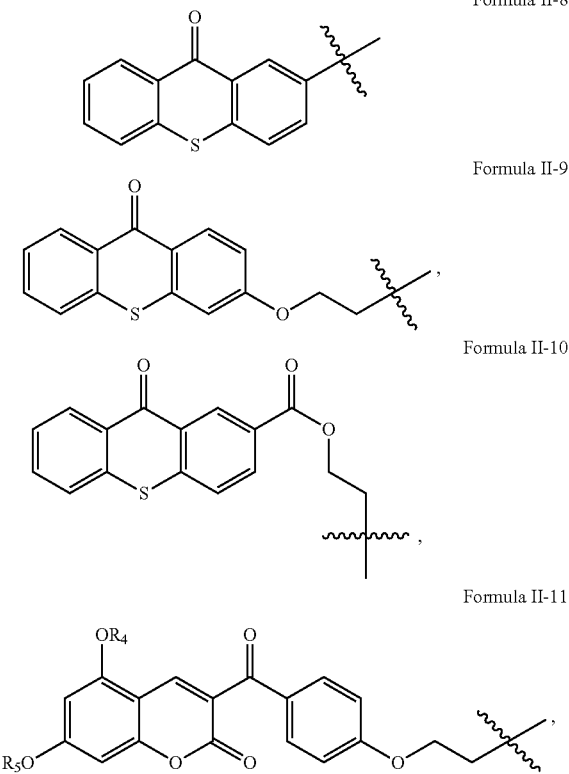

Formula II-8

Formula II-9

Formula II-10

Formula II-11

Wherein each of R4, R5 in formula II-11 are respectively C1-C4 alkyl.

In the polyacryate macromolecular photoinitiator of the disclosure, PI groups mass percentage accounts for 20-85% of the polyacrylate macromolecular photoinitiator.

The method for preparing the polyacrylate macromolecular photoinitiator of the disclosure is that: step 1, dissolving a compound of formula III-1, a compound of formula III-2, a molecular weight regulator and a thermal initiator in a solvent to carry out a polymerization reaction; step 2, after the polymerization reaction is finished, dripping a reaction solution into a post-treatment solvent, stirring, standing for liquid separation, separating out a lower layer polymer, and removing the solvent under reduced pressure to obtain a product,

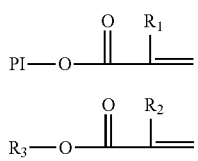

Formula III-1

Formula III-2

PI, $R_1$, $R_2$, $R_3$ in formula III-1 and formula III-2 are as defined in Formula I.

According to the disclosure, the thermal initiator is selected from azo-type initiators or organic peroxygen initiators, wherein the azo-type initiator is selected from azobisisobutyronitrile and azobisisoheptanenitrile; the organic peroxygen initiator is selected from dibenzoyl peroxide, dilauroyl peroxide, cumene hydroperoxide, t-butyl hydroperoxide, di(2-ethylhexyl)peroxydicarbonate, diisopropyl peroxydicarbonate, and dicyclohexyl peroxydicarbonate.

According to the disclosure, the molecular weight regulator is dodecanethiol; the post-treatment solvent is methanol or ethanol.

The disclosure also provides a photocurable composition, comprising:

a. at least one polyacrylate macromolecular photoinitiator as shown in formula I;

b. at least one olefin unsaturated compound capable of participating in free radical polymerization.

Wherein the olefin unsaturated compound comprises: epoxy acrylate resin, polyurethane acrylate resin, polyester acrylate resin, polyether acrylate resin, acrylated polyacrylate, epoxy methacrylate resin, polyurethane methacrylate resin, polyester methacrylate resin, polyether methacrylate resin, acrylated polymethacrylate and allyl ether compound; monomers are monofunctional, difunctional or multifunctional acrylates or methacrylates.

The photocurable composition further comprises at least one reactive amine co-initiator capable of participating in polymerization, for example, an acrylated amine co-initiator, such as Photomer 4250, Photomer 4775 and the like of IGM; or a polymeric tertiary amine co-initiator having a molecular weight greater than 1000.

The photocurable composition provided by the disclosure is used in the fields of food packaging printing, pharmaceutical packaging printing, furniture coating and the like with strict requirements on substance migration, for example, the photocurable composition is printed on a paper bag as a glazing oil, and has extremely low odor perception.

BRIEF DESCRIPTION OF THE DRAWINGS

Drawings of description forming one part of the application are used for providing further understanding to the disclosure, schematic embodiments of the disclosure and description thereof are used for explaining the disclosure, and are not intended to improperly limit the disclosure. In the drawings:

FIG. 1 shows a GPC molecular weight profile of Embodiment 1 product.

DETAILED DESCRIPTION OF THE EMBODIMENTS

Raw Material Preparation Example 1

Preparation of 4-(2-hydroxyethoxy)benzophenone

Step 1:

Adding 400 g of anhydrous aluminum trichloride, 750 g of dichloroethane into a 2500 ml four-mouth bottle, cooling to 5° C., dropwise adding 250 g of ethylene glycol phenyl ether acetate, reacting for 4 hours, dripping the reaction solution into 1000 ml of water, washing for three times, and desolventizing the organic phase to obtain a product [2-(4-benzoyl)phenoxy]ethanol acetate 350 g.

Step 2:

Adding 350 g of the product [2-(4-benzoyl)phenoxy]ethanol acetate obtained in the previous step and 1000 g of toluene into a 2000 ml four-mouth bottle, dropwise adding 350 g of 20% aqueous sodium hydroxide solution, and after reacting for 4 hours at 50° C., washing with 500 ml of 50° C. water each time for three times, and cooling to −15° C. for crystallization to obtain 4-(2-hydroxyethoxy)benzophenone 250 g.

Raw Material Preparation Example 2

Preparation of 2-(4-benzoyl)phenoxyethoxyethanol

Step 1:

Adding 100 g of 2-(2-phenoxyethoxy) ethanol and 60 g of acetic anhydride into a 250 ml four-mouth bottle, and reacting for 4 hours at 120° C. and then desolventing under reduced pressure to obtain 2-(2-phenoxyethoxy) ethyl acetate 120 g.

Step 2:

Adding 80 g of anhydrous aluminum trichloride and 150 g of dichloroethane into a 500 ml four-mouth bottle, cooling to 5° C., dropwise adding 50 g of the product 2-(2-phenoxyethoxy) ethyl acetate obtained in the previous step, reacting for 4 hours, dripping the reaction solution into 200 ml of water, washing with water for three times, and desolventing the organic phase to obtain a product [2-(4-benzoyl)phenoxyethoxy]ethanol acetate 70 g.

Step 3:

Adding 70 g of the product [2-(4-benzoyl)phenoxyethoxy]ethanol acetate obtained in the previous step and 100 g of isopropanol into a 500 ml four-mouth bottle, dropwise adding 70 g of 20% sodium hydroxide aqueous solution, reacting for 4 hours at room temperature, washing with 100 ml of 20% sodium chloride aqueous solution each time for three times, and carrying out rotary evaporation and desolvation on an organic phase to obtain a product 2-(4-benzoyl)phenoxyethoxyethanol 50 g.

Embodiment 1

Step 1:

Adding 90 g of the product 4-(2-hydroxyethoxy)benzophenone obtained in the raw material preparation example 1, 57 g of acrylic acid, 1.5 g of p-toluenesulfonic acid, 0.045 g of hydroquinone and 150 g of toluene into a 500 ml four-mouth bottle, carrying out reflux dehydration reaction for 24 hours, washing with 50 ml of water each time for three times until the pH of an aqueous phase being about 6-7, carrying out decompression desolvation after liquid separation to obtain a yellow oily liquid of [2-(4-benzoyl)phenoxy]ethyl acrylate 112 g.

Step 2:

Adding 100 g of the product [2-(4-benzoyl)phenoxy]ethyl acrylate obtained in the previous step, 100 g of butyl acrylate and 300 g of toluene into an 1 L four-mouth bottle, replacing gas in the bottle with nitrogen, dropwise adding a mixed solution of 100 g of toluene, 12 g of azobisisobutyronitrile and 4 g of dodecanethiol at 80° C., reacting for 6 hours, heating to 100° C., maintaining for 2 hours, and then cooling to room temperature. 200 g of solvent was removed by rotary evaporation under reduced pressure at 70° C. Adding 400 g of ethanol into an 1 L four-mouth bottle, cooling to 10° C., dropping the concentrated reaction solution under stirring, stirring for 30 min, standing for liquid separation, and carrying out vacuum rotary evaporation and desolvation on the lower resin at 80° C. for 1 hour to obtain 170 g of a yellowish product which is a macromolecular photoinitiator containing an initiator group shown as II-4. GPC test shows that the molecular weight of the initiator is 1000-100000, the content of the initiator group is 42%, and the data are shown in Table 1 and FIG. 1.

Embodiment 2

Step 1:

Adding 90 g of 4-(2-hydroxyethoxy)benzophenone, 57 g of acrylic acid, 1.5 g of p-toluenesulfonic acid, 0.045 g of hydroquinone and 150 g of toluene into a 500 ml four-mouth bottle, carrying out reflux dehydration reaction for 24 hours, washing with 50 ml of water each time for three times until the pH of an aqueous phase being about 6-7, carrying out decompression desolvation after liquid separation to obtain a yellow oily liquid of [2-(4-benzoyl)phenoxy]ethyl acrylate 112 g.

Step 2:

Adding 100 g of the product [2-(4-benzoyl)phenoxy]ethyl acrylate obtained in the previous step, 100 g of butyl acrylate and 300 g of toluene into an 1 L four-mouth bottle, replacing gas in the bottle with nitrogen, dropwise adding a mixed solution of 100 g of toluene, 24 g of azobisisoheptanenitrile and 10 g of dodecanethiol at 80° C., reacting for 6 hours, heating to 100° C., maintaining for 2 hours, and then cooling to room temperature. 200 g of solvent was removed by rotary evaporation under reduced pressure at 70° C. Adding 400 g of ethanol into an 1 L four-mouth bottle, cooling to 10° C., dropping the concentrated reaction solution under stirring, stirring for 30 min, standing for liquid separation, and carrying out vacuum rotary evaporation and desolvation on the lower resin at 80° C. for 1 hour to obtain 142 g of a yellowish product which is a macromolecular photoinitiator containing an initiator group shown as II-4. GPC test shows that the molecular weight of the initiator is 1000-13000, the content of the initiator group is 42%, and the data are shown in Table 1.

Embodiment 3

Step 1:

Adding 90 g of 4-(2-hydroxyethoxy)benzophenone, 57 g of acrylic acid, 1.5 g of p-toluenesulfonic acid, 0.045 g of hydroquinone and 150 g of toluene into a 500 ml four-mouth bottle, carrying out reflux dehydration reaction for 24 hours, washing with 50 ml of water each time for three times until the pH of an aqueous phase being about 6-7, carrying out decompression desolvation after liquid separation to obtain a yellow oily liquid of [2-(4-benzoyl)phenoxy]ethyl acrylate 112 g.

Step 2:

Adding 60 g of the product [2-(4-benzoyl)phenoxy]ethyl acrylate obtained in the previous step, 140 g of butyl acrylate and 300 g of toluene into an 1 L four-mouth bottle, replacing gas in the bottle with nitrogen, dropwise adding a mixed solution of 100 g of toluene, 24 g of azobisisoheptanenitle and 10 g of dodecanethiol at 80° C., reacting for 6 hours, heating to 100° C., maintaining for 2 hours, and then cooling to room temperature. 200 g of solvent was removed by rotary evaporation under reduced pressure at 70° C. Adding 400 g of ethanol into an 1 L four-mouth bottle, cooling to 10° C., dropping the concentrated reaction solution under stirring, stirring for 30 min, standing for liquid separation, and carrying out vacuum rotary evaporation and desolvation on the lower resin at 80° C. for 1 hour to obtain 102 g of a yellowish product, which is a macromolecular photoinitiator containing an initiator group shown as II-4, the content of the initiator group is 24%, and the data are shown in Table 1.

Embodiment 4

Step 1:

Adding 90 g of the product 4-(2-hydroxyethoxy)benzophenone obtained in the previous step, 57 g of acrylic acid, 1.5 g of p-toluenesulfonic acid, 0.045 g of hydroquinone and 150 g of toluene into a 500 ml four-mouth bottle, carrying out reflux dehydration reaction for 24 hours, washing with 50 ml of water each time for three times until the pH of an aqueous phase being about 6-7, carrying out decompression desolvation after liquid separation to obtain a yellow oily liquid of [2-(4-benzoyl)phenoxy]ethyl acrylate 112 g.

Step 2:

Adding 180 g of [2-(4-benzoyl)phenoxy]ethyl acrylate, 420 g of butyl acrylate and 300 g of toluene into an 1 L four-mouth bottle, replacing gas in the bottle with nitrogen, dropwise adding a mixed solution of 100 g of toluene, 24 g of azobisisoheptanenitrile and 10 g of dodecanethiol at 80° C., reacting for 6 hours, heating to 100° C., maintaining for 2 hours, and then cooling to room temperature. 200 g of solvent was removed by rotary evaporation under reduced pressure at 70° C. Adding 400 g of ethanol into an 1 L four-mouth bottle, cooling to 10° C., dropping the concentrated reaction solution under stirring, stirring for 30 min, standing for liquid separation, and carrying out vacuum rotary evaporation and desolvation on the lower resin at 80° C. for 1 hour to obtain 178 g of yellowish product, which is a macromolecular photoinitiator containing an initiator group shown as 1-4, the content of the initiator group is 73%, and the data are shown in Table 1.

Embodiment 5

Step 1:

Adding 20 g of the product 2-(4-benzoylphenoxyethoxy) ethanol obtained in raw material preparation example 2, 15 g of acrylic acid, 0.35 g of p-toluenesulfonic acid, 0.005 g of hydroquinone and 75 g of toluene into a 500 ml four-mouth bottle, carrying out reflux dehydration reaction for 24 hours, washing with 50 ml of water each time for three times until the pH of an aqueous phase being about 6-7, carrying out decompression desolvation after liquid separation to obtain a yellow oily liquid of [2-(4-benzoyl)phenoxyethoxy] ethyl acrylate 27 g.

Step 2:

Adding 10 g of the product [2-(4-benzoyl)phenoxyethoxy]ethyl acrylate obtained in the previous step, 10 g of butyl acrylate, 30 g of toluene into a 250 ml four-mouth bottle, replacing gas in the bottle with nitrogen, and dropwise adding a mixed solution of 10 g of toluene, 0.6 g of benzoyl peroxide and 0.2 g of dodecanethiol at 100° C., reacting for 6 hours, heating to 120° C., maintaining for 2 hours, and then cooling to room temperature. Adding 80 g of ethanol into a 250 ml four-mouth bottle, cooling to 10° C., dropping the concentrated reaction solution under stirring, stirring for 30 min, standing for liquid separation, and carrying out vacuum rotary evaporation and desolvation on the lower resin at 80° C. for 1 hour to obtain 11 g of a yellowish product, which is a macromolecular photoinitiator containing an initiator group shown as formula II-6, the content of the initiator group is 38%, and the data are shown in table 1.

Embodiment 6

Step 1:

Adding 10 g of 2-hydroxythioxanthone, 8 g of acrylic acid, 20 g of toluene, 0.2 g of p-toluenesulfonic acid and 0.005 g of hydroquinone into a 250 ml four-mouth bottle, carrying out reflux dehydration reaction for 12 hours, washing with 50 ml of water each time for three times until the pH of an aqueous phase being about 6-7, carrying out decompression desolvation after liquid separation to obtain 13 g of yellow oily liquid.

Step 2:

Adding 10 g of the product obtained in the previous step, 10 g of butyl acrylate and 30 g of toluene into a 250 ml four-mouth bottle, replacing gas in the bottle with nitrogen, dropwise adding a mixed solution of 10 g of toluene, 0.6 g of azobisisobutyronitrile and 0.2 g of dodecanethiol at 80° C., reacting for 6 hours, heating to 100° C., maintaining for 2 hours, and then cooling to room temperature. Adding 80 g of methanol into a 250 ml four-mouth bottle, cooling to 10° C., dropping the concentrated reaction solution under stirring, stirring for 30 min, standing for liquid separation, and carrying out vacuum rotary evaporation and desolvation on the lower resin at 80° C. for 1 hour to obtain 13 g of a yellow product, which is a macromolecular photoinitiator containing an initiator group shown as formula II-8, and the content of the initiator group is 43%, and the data are shown in table 1.

Embodiment 7

Step 1:

Adding 10 g of 4-hydroxybenzophenone, 5 g of acryloyl chloride, 10 g of potassium carbonate, 20 g of DMF into a 250 ml four-mouth bottle, reacting for 4 hours at 80° C. and then desolventing under reduced pressure, dissolving 30 g of ethanol and then crystallizing to obtain 12 g of 4-benzoyl phenyl acrylate as a white solid powder.

Step 2:

Adding 10 g of the product obtained in the previous step, 10 g of butyl acrylate and 30 g of toluene into a 250 ml four-mouth bottle, replacing gas in the bottle with nitrogen, dropwise adding a mixed solution of 10 g of toluene, 0.6 g of azobisisobutyronitrile and 0.2 g of dodecanethiol at 80° C., reacting for 6 hours, heating to 100° C., maintaining for 2 hours, and then cooling to room temperature. Adding 80 g of ethanol into a 250 ml four-mouth bottle, cooling to 10° C., dropping the concentrated reaction solution under stirring, stirring for 30 min, standing for liquid separation, and carrying out vacuum rotary evaporation and desolvation on the lower resin at 80° C. for 1 hour to obtain 11 g of a yellowish product, which is a macromolecular photoinitiator containing an initiator group shown as formula II-1, the content of the initiator group is 40%, and the data are shown in table 1.

Embodiment 8

Step 1:

Adding 10 g of 2-hydroxythioxanthone, 8 g of acrylic acid, 20 g of toluene, 0.2 g of p-toluenesulfonic acid and 0.005 g of hydroquinone into a 250 ml four-mouth bottle, carrying out reflux dehydration reaction for 12 hours, washing with 50 ml of water each time for three times until the pH of an aqueous phase being about 6-7, carrying out decompression desolvation after liquid separation to obtain 13 g of yellow oily liquid.

Step 2:

Adding 90 g of the product 4-(2-hydroxyethoxy)benzophenone obtained in the raw material preparation example 1, 57 g of acrylic acid, 1.5 g of p-toluenesulfonic acid, 0.045 g of hydroquinone and 150 g of toluene into a 500 ml four-mouth bottle, carrying out reflux dehydration reaction for 24 hours, washing with 50 ml of water each time for three times until the pH of an aqueous phase being about 6-7, carrying out decompression desolvation after liquid separation to obtain a yellow oily liquid of [2-(4-benzoyl)phenoxy] ethyl acrylate 112 g.

Step 3:

Adding 5 g of the product obtained in step 1, 5 g of the product obtained in step 2, 10 g of butyl acrylate and 30 g of toluene into a 250 ml four-mouth bottle, replacing gas in the bottle with nitrogen, dropwise adding a mixed solution of 10 g of toluene, 0.6 g of azobisisobutyronitrile and 0.2 g of dodecanethiol at 80° C., reacting for 6 hours, heating to 100° C., maintaining for 2 hours, and then cooling to room temperature. Adding 80 g of methanol into a 250 ml four-mouth bottle, cooling to 10° C., dropping the concentrated reaction solution under stirring, stirring for 30 min, standing for liquid separation, and carrying out vacuum rotary evaporation and desolvation on the lower resin at 80° C. for 1 hour to obtain 13 g of a yellow product, which is a macromolecular photoinitiator simultaneously containing initiator groups shown as formula II-4 and formula II-8, and the content of the initiator groups is 43%; the data are shown in Table 1.

Embodiment 9

Step 1:

Adding 10 g of 3-[4'-(2"-hydroxyethyl) benzoyl)-5,7-dimethoxycoumarin, 8 g of acrylic acid, 20 g of toluene, 0.2 g of p-toluenesulfonic acid, 0.005 g of hydroquinone into a 250 ml four-mouth bottle, carrying out reflux dehydration reaction for 12 hours, washing with 50 ml of water each time for three times until the pH of an aqueous phase being about 6-7, carrying out decompression desolvation after liquid separation to obtain 12 g of a yellow oily liquid.

Step 2:

Adding 10 g of the product obtained in the previous step, 10 g of butyl acrylate and 30 g of toluene into a 250 ml four-mouth bottle, replacing gas in the bottle with nitrogen, dropwise adding a mixed solution of 10 g of toluene, 0.6 g of azobisisobutyronitrile and 0.2 g of dodecanethiol at 80° C., reacting for 6 hours, heating to 100° C., maintaining for 2 hours, and then cooling to room temperature. Adding 80 g of ethanol into a 250 ml four-mouth bottle, cooling to 10° C., dropping the concentrated reaction solution under stirring, stirring for 30 min, standing for liquid separation, and carrying out vacuum rotary evaporation and desolvation on the lower resin at 80° C. for 1 hour to obtain 18 g of a yellowish product, which is a macromolecular photoinitiator containing an initiator group shown as formula II-11, the content of the initiator group is 43%, and the data are shown in table 1.

TABLE 1

Molecular weight data measured by GPC method

| Sample Name | Test Item | Mn | Mw | Molecular Weight Distribution Minimum |
|---|---|---|---|---|
| Embodiment 1 product | molecular weight | 7711.9 | 15819 | >1000 |
| Embodiment 2 product | molecular weight | 3262.6 | 5214.7 | >1000 |
| Embodiment 3 product | molecular weight | 5276.8 | 8365.2 | >1000 |
| Embodiment 4 product | molecular weight | 9535.1 | 19833 | >1000 |
| Embodiment 5 product | molecular weight | 9022.0 | 18332 | >1000 |
| Embodiment 6 product | molecular weight | 8532.1 | 16255 | >1000 |
| Embodiment 7 product | molecular weight | 6522.4 | 9521.2 | >1000 |
| Embodiment 8 product | molecular weight | 8032.8 | 15997 | >1000 |
| Embodiment 9 product | molecular weight | 9032.1 | 16322.1 | >1000 |

APPLICATION EXAMPLES

Embodiment 9

Application of Polyacrylate Macromolecule 10 groups of formulations are prepared according to the mass proportion in table 2, 25 μm wire rods are coated on a white cardboard plate, after 4 m/min belt speed curing of a 2000 W high-pressure mercury lamp for one time, 10 groups of F1-F10 sample plates are obtained, and the curing effect is tested by a touch dry method; the odor of the cured surface is artificially sensed. The test results are shown in Table 3, the polyacrylate macromolecular photoinitiator provided by the disclosure has good curing performance and lower odor than commercially available small molecule photoinitiators and macromolecular photo initiators.

TABLE 2

Photocurable composition formulation table

| Experimental Formulation | Photoinitiator | Photoinitiator Amount | TMP3EOTA | Photomer 3316 | Photomer 4250 |
|---|---|---|---|---|---|
| F1 | Embodiment 1 product | 0.4 | 4.6 | 4.6 | 0.4 |
| F2 | Embodiment 2 product | 0.4 | 4.6 | 4.6 | 0.4 |
| F3 | Embodiment 3 product | 0.4 | 4.6 | 4.6 | 0.4 |

TABLE 2-continued

Photocurable composition formulation table

| Experimental Formulation | Photoinitiator | Photoinitiator Amount | TMP3EOTA | Photomer 3316 | Photomer 4250 |
|---|---|---|---|---|---|
| F4 | Embodiment 4 product | 0.4 | 4.6 | 4.6 | 0.4 |
| F5 | Embodiment 5 product | 0.4 | 4.6 | 4.6 | 0.4 |
| F6 | Embodiment 6 product | 0.4 | 4.6 | 4.6 | 0.4 |
| F7 | Embodiment 7 product | 0.4 | 4.6 | 4.6 | 0.4 |
| F8 | Embodiment 8 product | 0.4 | 4.6 | 4.6 | 0.4 |
| F9 | Embodiment 9 product | 0.4 | 4.6 | 4.6 | 0.4 |
| F10 | Benzophenone | 0.4 | 4.6 | 4.6 | 0.4 |
| F11 | Omnipol BP | 0.4 | 4.6 | 4.6 | 0.4 |

\* Photomer 3316 is an acrylate resin of IGM, which is a kind of epoxy acrylate resin;
Photomer 4250 is a reactive amine of IGM;
Omnipol BP is a macromolecular photoinitiator of IGM;
TMP3EOTA is ethoxylated trimethylolpropane triacrylate.

TABLE 3

Application test results of photocurable compositions

| Experimental Formulation | Photoinitiator | Curing Effect | Surface Odor after Curing |
|---|---|---|---|
| F1 | Embodiment 1 product | Good curing | Almost odourless |
| F2 | Embodiment 2 product | Good curing | Almost odourless |
| F3 | Embodiment 3 product | Good curing | Almost odourless |
| F4 | Embodiment 4 product | Good curing | Almost odourless |
| F5 | Embodiment 5 product | Good curing | Almost odourless |
| F6 | Embodiment 6 product | Good curing | Almost odourless |
| F7 | Embodiment 7 product | Good curing | Almost odourless |
| F8 | Embodiment 8 product | Good curing | Almost odourless |
| F9 | Embodiment 9 product | Good curing | Almost odourless |
| F10 | Benzophenone | Good curing | Distinct odour |
| F11 | Omnipol BP | Good curing | Slight odor |

What is claimed is:

1. A method for preparing a polyacrylate macromolecular photoinitiator, which is free of a component having a molecular weight of less than 1000, and a general formula thereof being as shown in formula I:

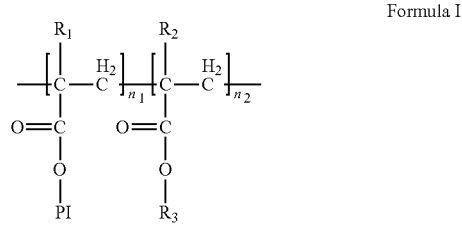

Formula I in formula I, PI is a hydrogen abstraction type photoinitiator group; $R_1$ and $R_2$ are each H or $CH_3$; $R_3$ is $C_1$-$C_8$ alkyl, $C_1$-$C_8$ alkyl substituted with hydroxy, $C_1$-$C_3$ alkyl terminally substituted with $C_5$-$C_6$ cycloalkyl, $C_5$-$C_6$ cycloalkyl or H; $n_1$ is an integer greater than or equal to 1; $n_2$ is an, integer greater than or equal to 0; a mass percent of the PI group in the polyacrylate macromolecular photoinitiator is 20%-85%, the method comprises: step 1, dissolving a compound of formula III-1, a compound of formula III-2, a molecular weight regulator and a thermal initiator in a solvent to carry out a polymerization reaction to obtain a reaction solution; step 2, after the polymerization reaction is finished, dripping the reaction solution into a post-treatment solvent, standing for liquid separation, separating a lower layer polymer which is prepared in the polymerization reaction and the post-treatment solvent, and removing the post-treatment solvent under reduced pressure to obtain a product, which is the polyacrylate macromolecular photoinitiator;

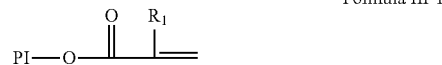

Formula III-1

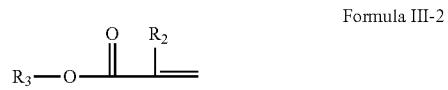

Formula III-2

PI, $R_1$, $R_2$, $R_3$ in formula III-1 and formula III-2 are as defined in formula I.

2. The method for preparing the polyacrylate macromolecular photoinitiator as claimed in claim 1, wherein that the post-treatment solvent is methanol or ethanol.

3. The method for preparing the polyacrylate macromolecular photoinitiator as claimed in claim 1, wherein that the molecular weight regulator is dodecanethiol.

4. The method for preparing the polyacrylate macromolecular photoinitiator as claimed in claim 1, wherein that the thermal initiator is selected from azo-type initiators or organic peroxygen initiators.

5. The method for preparing the polyacrylate macromolecular photoinitiator as claimed in claim 4, wherein that the azo-type initiator is selected from azobisisobutyronitrile and azobisisoheptanenitrile.

6. The method for preparing the polyacrylate macromolecular photoinitiator as claimed in claim 4, wherein that the organic peroxygen initiator is selected from dibenzoyl peroxide, dilauroyl peroxide, cumene hydroperoxide, t-butyl hydroperoxide, di(2-ethylhexyl)peroxydicarbonate, diisopropyl peroxydicarbonate, and dicyclohexyl peroxydicarbonate.

7. The method for preparing the polyacrylate macromolecular photoinitiator as claimed in claim 1, wherein that the PI group of formula I is selected from benzophenone-type photoinitiator groups, coumarin-type photoinitiator groups or thioxanthone-type photoinitiator groups.

8. The method for preparing the polyacrylate macromolecular photoinitiator as claimed in claim 7, wherein that the PI group of formula I is selected from one or more of formulas II-1 to II-11:

Formula II-1
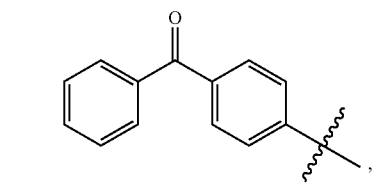

Formula II-2
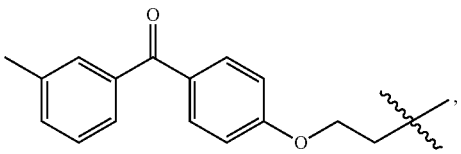

Formula II-3
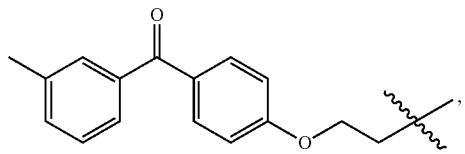

Formula II-4
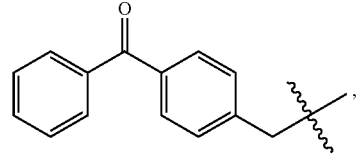

Formula II-5
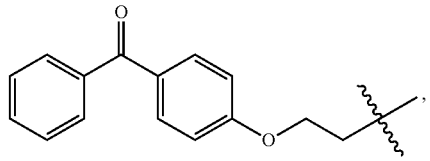

Formula II-6
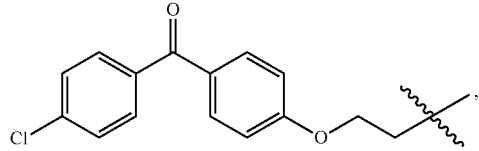

Formula II-7
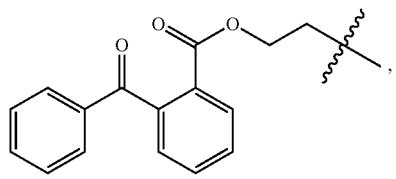

Formula II-8
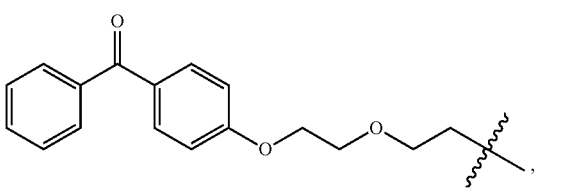

Formula II-9
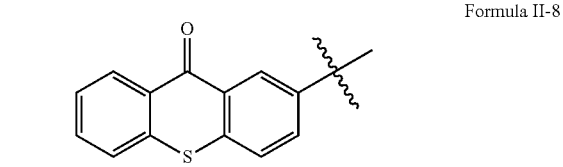

Formula II-10
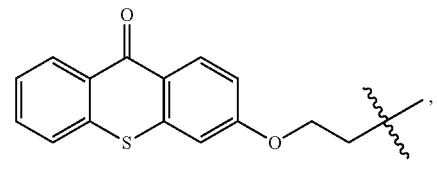
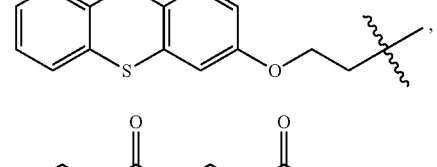

Formula II-11
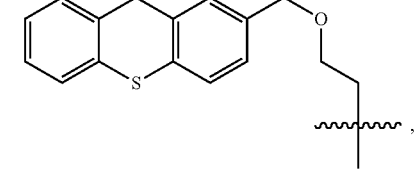

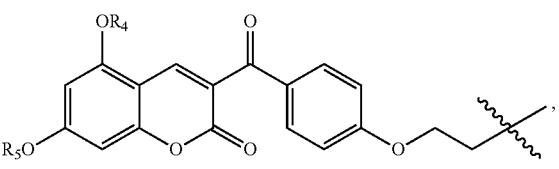

wherein, $R_4$, $R_5$ in formula II-11 are respectively $C_1$-$C_4$ alkyl.

* * * * *